United States Patent
Klug

(10) Patent No.: US 7,110,410 B1
(45) Date of Patent: Sep. 19, 2006

(54) METHOD AND APPARATUS FOR COUPLING AN ATM COMMUNICATION LAYER TO A PLURALITY OF TIME-DIVISION MULTIPLEX COMMUNICATION TERMINALS

(75) Inventor: Andreas Klug, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/647,431

(22) PCT Filed: Mar. 19, 1999

(86) PCT No.: PCT/DE99/00783

§ 371 (c)(1),
(2), (4) Date: Oct. 2, 2000

(87) PCT Pub. No.: WO99/52321

PCT Pub. Date: Oct. 14, 1999

(30) Foreign Application Priority Data

Apr. 7, 1998 (DE) .................................. 198 15 605

(51) Int. Cl.
*H04L 12/56* (2006.01)
(52) U.S. Cl. .................... 370/395.4; 370/235; 370/468
(58) Field of Classification Search ................ 370/235, 370/395.1, 395.21, 395.4, 412, 468, 395.6, 370/395.62, 458, 459
See application file for complete search history.

(56) References Cited

U.S. PATENT DOCUMENTS

| | | | | |
|---|---|---|---|---|
| 5,119,406 A | * | 6/1992 | Kramer | ....................... 375/372 |
| 5,222,108 A | | 6/1993 | Suzuki | |
| 5,322,108 A | | 6/1994 | Hoffman | |

(Continued)

FOREIGN PATENT DOCUMENTS

EP 0 614 324 A2 9/1994

(Continued)

OTHER PUBLICATIONS

Yum, T.-S. et al. "A TDM-based Multibus Packet Switch". IEEE INFOCOM '92. May 4-8, 1992. vol. 3. pp. 2509-2515.*

(Continued)

*Primary Examiner*—Hassan Kizou
*Assistant Examiner*—Donald L. Mills
(74) *Attorney, Agent, or Firm*—Bell, Boyd & Lloyd LLC

(57) ABSTRACT

A method and apparatus for coupling an ATM communication layer to a plurality of N mutually time-independent time-division multiplex communication terminals having an overall payload cell rate $CR_N$ which involves: generating a control signal sequence with a clock rate corresponding to the overall payload cell rate $CR_N$ of the N time-division multiplex communication terminals, whereby the control signals can represent a first or a second status; offering a fixed data pattern; transmitting the ATM cells coming from the ATM communication layer into an ATM cell waiting list; transmitting, on demand, an ATM cell from the ATM waiting list to the requesting time-division multiplex communication terminal when the respectively oldest control signal of the control signal sequence represents the first status, and transmitting the fixed data pattern to the requesting time-division multiplex communication terminal when the oldest control signal of the control signal sequence represents the second status; and deleting the oldest control signal of the control signal sequence. The method enables a frictionless coupling of an ATM communication layer having a plurality of mutually independent time-division multiplex communication terminals, whereby variable data rates (burst behavior) of the ATM layer as well as of the time-division multiplex communication terminals can be decoupled from one another and good cell delay variation (CDV) properties can be assured.

10 Claims, 1 Drawing Sheet

U.S. PATENT DOCUMENTS

| | | | |
|---|---|---|---|
| 5,412,655 A * | 5/1995 | Yamada et al. | 370/474 |
| 5,509,001 A | 4/1996 | Tachibana | |
| 5,633,870 A * | 5/1997 | Gaytan et al. | 370/235 |
| 5,757,771 A * | 5/1998 | Li et al. | 370/235 |
| 5,799,014 A * | 8/1998 | Kozaki et al. | 370/358 |
| 5,805,588 A * | 9/1998 | Petersen | 370/356 |
| 5,862,136 A * | 1/1999 | Irwin | 370/395.4 |
| 5,889,765 A * | 3/1999 | Gibbs | 370/310.2 |
| 5,946,297 A * | 8/1999 | Calvignac et al. | 370/230 |
| 6,529,510 B1 * | 3/2003 | Lee | 370/395.61 |

FOREIGN PATENT DOCUMENTS

| | | |
|---|---|---|
| EP | 680237 A2 * | 11/1995 |
| WO | WO 97/32447 | 9/1997 |
| WO | WO 9809471 A1 * | 3/1998 |

OTHER PUBLICATIONS

Zaghloul, A. O. et al. "Performance Analysis of a Shared-medium ATM Switch". IEEE Symposium on Computers and Communications. Jun. 1995. pp. 16-22.*

* cited by examiner

METHOD AND APPARATUS FOR COUPLING AN ATM COMMUNICATION LAYER TO A PLURALITY OF TIME-DIVISION MULTIPLEX COMMUNICATION TERMINALS

BACKGROUND OF THE INVENTION

1. Field of the Invention

The present invention is directed to both a method and an apparatus for coupling an ATM communication layer to a plurality of mutually independent time-division multiplex communication terminals such that, in particular, all loses are avoided and the variation of the cell delay is minimized.

2. Description of the Prior Art

In the asynchronous transfer mode (ATM), data is transmitted in the ATM layer in cells of 53 bytes (48 bytes payload data and 5 bytes control data) independently of the information they represent (voice communication, data communication, multimedia). The cells are thereby not transmitted continuously but asynchronously, or burst-by-burst dependent, on the momentary demand for transmission bandwidth.

In order to couple such a high-performance ATM layer to terminal points or local networks, it is necessary to divide the cell stream of the ATM layer onto a plurality of time-division multiplex communication terminals (ports) that are independent of one another in terms of time. The problem of decoupling the time-uncorrelated behavior of the ATM communication layer with [sic!] the time-uncorrelated cell transmission demands of the plurality of time-division multiplex communication terminals arises. In order to thereby meet the real-time demands made, for example, of the voice communication, an optimally favorable cell delay variation (CDV) behavior must be assured. That is, the time delay of individual cells should not fluctuate more than a defined value in order to avoid a falsification of the time sequence of cells in the transmission of successive cells via different communication paths.

For a plurality N of time-division multiplex communication terminals, it is known to generate a waiting list having a cell rate corresponding to N-times the cell rate of the individual ports (assuming all ports have the same, typical transmission bandwidth). The cells waiting lists [sic] are then distributed onto the N terminals according to what is referred to as the round-robin method. Those of the N terminals that request a cell at the moment are thereby successively serviced cell-by-cell by the waiting list in a fixed sequence. Since the N communication terminals are independent of one another in terms of time, it can occur that up to N cells are simultaneously requested from the waiting list at a specific point in time. The coupling of the ATM communication layer must thus be able to "buffer" both the ATM bursts as well as the port-side fluctuations in the demand for cells. On the other hand, excessively long waiting lists lead to a deterioration of the cell delay variation behavior of the coupling.

The format and the specifications of the ATM layer are described, for example, in Rathgeb, Wallmeier, "ATM-Infrastruktur für die Hochleistungskommunikation", pp. 78–90, and the coupling to a plurality of time-division multiplex terminals is described in ATM-Forum, "Baseline Text for Inverse Multiplexing for ATM AF-PHY-0086.000."

The present invention is, therefore, directed to a method and an apparatus for coupling an ATM communication layer to a plurality of time-division multiplexer communication terminals, whereby cell loses are avoided and the variation of the cell delay is minimized.

SUMMARY OF THE INVENTION

Accordingly, in an embodiment of the present invention, a method is provided for coupling an ATM communication layer to a plurality of N mutually time-independent time-division multiplex communication terminals having an overall payload cell rate $CR_N$, wherein the method includes the steps of: generating a control signal sequence with a clock rate corresponding to the overall payload cell rate $CR_N$ of the N time-division multiplex communication terminals, whereby the control signals represent one of a first and a second status; offering a fixed data pattern; transmitting ATM cells coming from the ATM communication layer into an ATM cell waiting list; transmitting, on demand, an ATM cell from the ATM waiting list to the requesting time-division multiplex communication terminal when a respectively oldest control signal of the control signal sequence represents the first status, and transmitting the fixed data pattern to the requesting time-division multiplex communication terminal when the oldest control signal of the control signal sequence represents the second status; and deleting the oldest control signal of the control signal sequence.

In an embodiment, the method further includes the steps of: allocating a control signal that represents the first status to each ATM cell of the ATM waiting list in the control signal sequence; carrying out a check, when a new control signal of the control signal sequence is generated in coincidence with the prescribed clock rate, to see whether an ATM cell to which no control signal representing the first status is allocated is still present in the ATM waiting list; generating a control signal representing the first status when an ATM cell to which no control signal representing the first status is allocated is still present in the ATM waiting list; and generating a control signal representing the second status when an ATM cell to which no control signal representing the first status is allocated is not present in the ATM waiting list.

In an embodiment of the method, the control signal representing the first status is represented by a logical "1" and the control signal representing the second status is represented by a logical "0".

In an embodiment of the method, the control signal sequence has a length of up to 3·N signals.

In an embodiment, the method further includes the step of enabling a cell transmission from the ATM communication layer into the ATM waiting list when the plurality of ATM cells present in the waiting list minus the plurality of control signals of the control signal sequence representing the first status is ≦X.

In an embodiment of the method, X≧1.

In an embodiment of the method, X=1.

In an embodiment of the method, the N time-division multiplex terminals are uncorrelated.

In an embodiment, the method further includes the step of dividing the ATM cells and the cells containing the fixed data pattern onto the N communication terminals according to a round-robin method.

In a further embodiment of the present invention, an apparatus is provided for coupling an ATM communication layer to a plurality of N mutually time-independent time-division multiplex communication terminals having an overall payload cell rate $CR_N$, wherein the apparatus includes: a generator for generating a control signal sequence with a clock rate corresponding to the overall payload cell rate $CR_N$ of the N time-division multiplex communication terminals, whereby the control signals represent one of a first and a second status; a device for offering a fixed data pattern; a first transmitter for transmitting ATM cells coming from the ATM communication layer into an ATM cell waiting list; a second transmitter for transmitting an ATM cell from the ATM waiting list to a requesting time-division multiplex communication terminal when a respectively oldest control signal of the control signal sequence represents the first status, and transmitting the fixed data pattern to the requesting time-division multiplex communication terminal when the oldest control signal of the control signal sequence represents the second status; and a device for deleting the oldest control signal of the control signal sequence.

As a result of the control signal sequence, a clocking of the transmission of the communication cells from the ATM waiting list to the requesting terminal (port) is prescribed that is independent of the asynchronous delivery of ATM cells into the ATM cell waiting list as well as of the non-uniform cell demand of the N ports that are independent of one another in terms of time. The control signal sequence emulates a behavior of the time-uncorrelated communication terminals (physical layer) corresponding to a terminal with N-fold bandwidth. The clock rate is thereby selected corresponding to the overall bandwidth of the n ports, so that the plurality of cells generated in the N-port waiting list is equal, on average, to the cell demand of the N ports. Depending on whether an ATM cell is in the ATM waiting list or not, either this ATM cell or a fixed data pattern (stuffing cell) is transmitted. Which of the two cell contents is added to the N-port waiting list is dependent on the respectively oldest control signal of the control signal sequence. The control signal can thereby represent a first or a second status.

A control signal representing the first of the two statusses is preferably allocated to each cell in the ATM cell waiting list. A check to see whether a cell to which a control signal representing the first status has not yet been allocated is in the ATM waiting list is carried out at every point in time defined by the prescribed clock rate for generating a new control signal. When this is the case, a control signal, for example a logical "1", representing the first status is generated. Otherwise, a control signal, for example a logical "0", representing the second status is generated. The length of the control signal sequence can be selected according to the method of virtual chaining of the N communication ports and can, for example, amount to up to 3·N control signals.

The transmission of a cell from the ATM communication layer into the ATM waiting list is only enabled when the plurality of cells in the ATM waiting list minus the plurality of control signals representing the first status ("ones") is less than or equal to a number X. The lead time for the cell transmission from the ATM layer to the communication terminals can be set with X. X must be at least $\geq 1$ in order to dependably assure the transmission of all cells. However, the lead time varies all the more and the cell delay variation (CDV) behavior is all the poorer the higher X is set.

The N time-division communication terminals can be either completely uncorrelated or partly correlated with one another. The division of the cells onto the N terminals can occur according to the round-robin method or a method that is suited dependent on the desired application.

Additional features and advantages of the present invention are described in, and will be apparent from, the Detailed Description of the Preferred Embodiments and the Drawings.

DETAILED DESCRIPTION OF THE PREFERRED EMBODIMENTS

Figure 1:
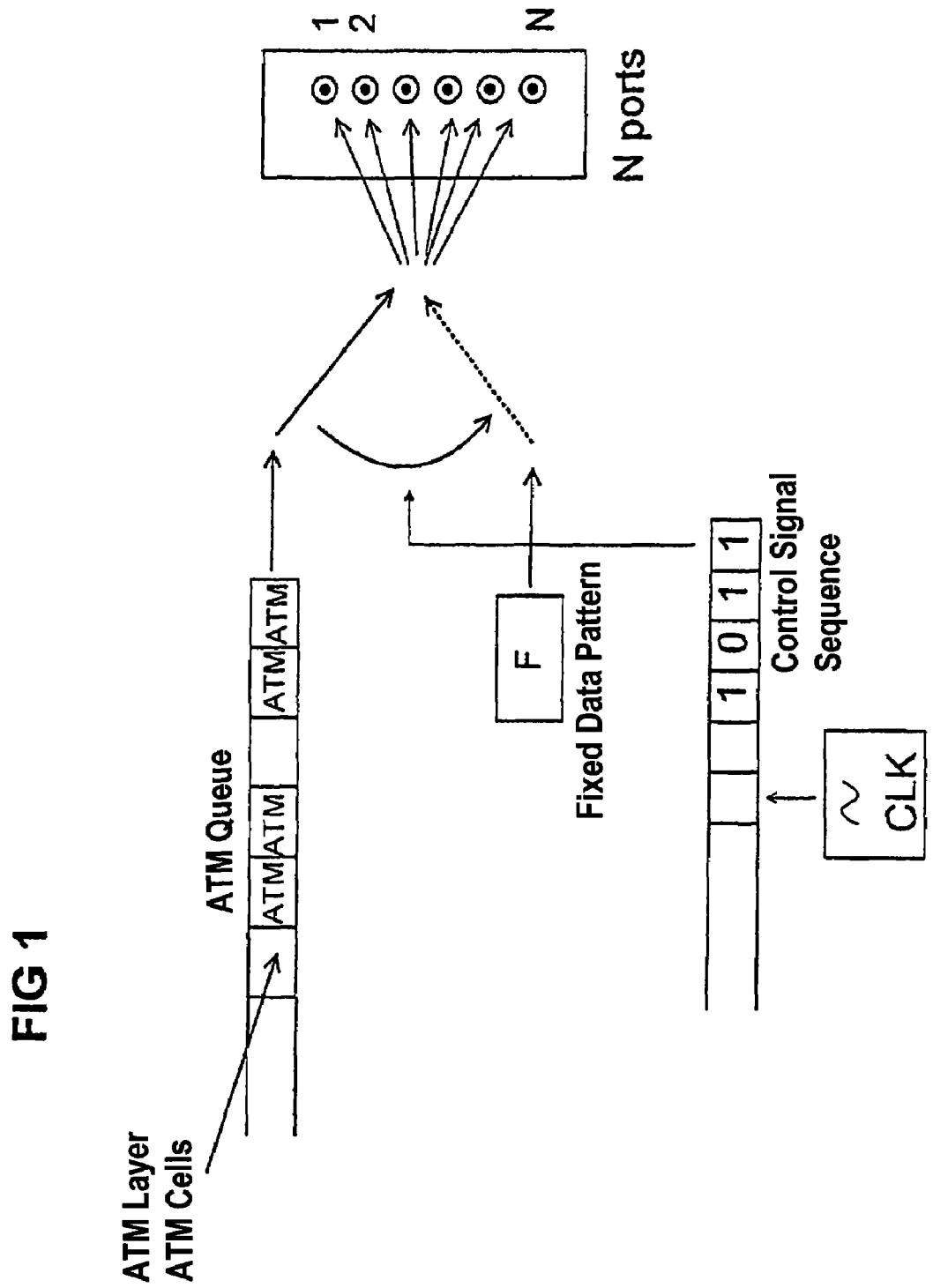
FIG. 1 shows a schematic drawing exemplying the method of the present invention.

Referring to FIG. 1, the data to be transmitted proceeds from the ATM layer onto the ATM cell waiting list uncorrelated in time in units of ATM cells of 53 bytes. A clock generator circuit CLK generates clock pulses with a frequency that corresponds to the overall cell rate of all N time-division multiplex communication terminals that are connected. At every point in time of a clock pulse, the inventive apparatus checks to see whether an ATM cell to which a control signal was not yet allocated is in the ATM cell waiting list. When this is the case, a logical "1" is entered into the control signal sequence as control signal. When no "new" ATM cell is in the waiting list, then a "0" is entered into the control signal sequence. This operation is repeated at every clock pulse from the clock generator circuit CLK, so that a "1" of the control signal sequence is allocated to every ATM cell in the ATM cell waiting list. When a cell request occurs from one of the N communication terminals, then the entry in the control signal sequence decides whether an ATM cell or a fixed data pattern F, what is referred to as a stuffing cell, is transmitted. When the foremost (oldest) signal of the control signal sequence is a "1", then, for example, an ATM cell is transmitted; When it is a "0", then the stuffing cell F is transmitted. The division of the cells onto the N time-division multiplex communication terminals occurs according to the known round-robin method. Subsequently, this oldest signal of the control signal sequence is deleted.

In order to avoid a cell loss, the inventive coupling device checks whether the plurality of ATM cells in the ATM waiting list minus the plurality of "ones" in the control signal sequence is less than or equal to x (with $x \geq 1$). When this is the case, a maximum of one ATM cell to which a "1" has not yet been allocated in the control signal sequence is in the waiting list, and the transmission of ATM cells into the ATM waiting list is enabled. When the difference is greater, then the transmission is blocked until enough "ones" have again been generated in the control signal sequence.

The present invention thus enables an asynchronous coupling of an ATM communication layer to a plurality of mutually independent time-division multiplex communication terminals, whereby cell losses are avoided and the cell delay time variation is kept to a minimum at the same time. The control signal sequence emulates a behavior of the N mutually time-independent communication terminals like a terminal with the overall bandwidth of all N terminals. As a result thereof, bursts of the ATM layer and burst-like behavior of the time-uncorrelated terminal are decoupled from one another.

Although the present invention has been described with reference to specific embodiments, those of skill in the art will recognize that changes may be made thereto without departing from the spirit and scope of the invention as set forth in the hereafter appended claims.

I claim as my invention:

1. A method for coupling an ATM communication layer to a plurality of N mutually time-independent time division multiplex communication terminals having an overall payload cell rate $CR_N$, the method comprising the steps of:

generating a control signal sequence with a clock rate corresponding to the overall payload cell rate $CR_N$ of the N time-division multiplex communication terminals, whereby control signals in the control signal sequence represent one of a first and a second status;

offering a fixed data pattern;

transmitting ATM cells coming from the ATM communication layer into an ATM cell waiting list;

transmitting, on demand, an ATM cell from the ATM waiting list to the requesting time-division multiplex communication terminal when a respectively oldest control signal of the control signal sequence represents the first status, and transmitting the fixed data pattern to the requesting time-division multiplex communication terminal when the oldest control signal of the control signal sequence represents the second status; and deleting the oldest control signal of the control signal sequence.

2. A method for coupling an ATM communication layer to a plurality of N mutually time-independent time-division multiplex communication terminals as claimed in claim 1, the method further comprising the steps of:

allocating a control signal that represents the first status to each ATM cell of the ATM waiting list in the control signal sequence;

carrying out a check, when a new control signal of the control signal sequence is generated in coincidence with the prescribed clock rate to see whether an ATM cell to which no control signal representing the first status is allocated is still present in the ATM waiting list;

generating a control signal representing the first status when an ATM cell to which no control signal representing the first status is allocated is still present in the ATM waiting list; and generating a control signal representing the second status when an ATM cell to which no control signal representing the first status is allocated is not present in the ATM waiting list.

3. A method for coupling an ATM communication layer to a plurality of N mutually time-independent time-division multiplex communication terminals as claimed in claim 1, wherein the control signal representing the first status is represented by a logical "1" and the control signal representing the second status is represented by a logical "0".

4. A method for coupling an ATM communication layer to a plurality of N mutually time-independent time-division multiplex communication terminals as claimed in claim 1, wherein the control signal sequence has a length of up to 3·N signals.

5. A method for coupling an ATM communication layer to a plurality of N mutually time-independent time-division multiplex communication terminals as claimed in claim 1, the method further comprising the step of enabling a cell transmission from the ATM communication layer into the ATM waiting list when the plurality of ATM cells present in the waiting list minus the plurality of control signals of the control signal sequence representing the first status is $\geq X$.

6. A method for coupling an ATM communication layer to a plurality of N mutually time-independent time-division multiplex communication terminals as claimed in claim 5, wherein $X \geq 1$.

7. A method for coupling an ATM communication layer to a plurality of N mutually time-independent time-division multiplex communication terminals as claimed in claim 6, wherein $X=1$.

8. A method for coupling an ATM communication layer to a plurality of N mutually time-independent time-division multiplex communication terminals as claimed in claim 1, wherein the N time-division multiplex terminals are uncorrelated.

9. A method for coupling an ATM communication layer to a plurality of N mutually time-independent time-division multiplex communication terminals as claimed in claim 8, the method further comprising the step of dividing the ATM cells and the cells containing the fixed data pattern onto the N communication terminals according to a round-robin method.

10. An apparatus for coupling an ATM communication layer to a plurality of N mutually time-independent time-division multiplex communication terminals having an overall payload cell rate $CR_N$, the apparatus comprising:

a generator for generating a control signal sequence with a clock rate corresponding to the overall payload cell rate $CR_N$ of the N time-division multiplex communication terminals, whereby control signals in the control signal sequence represent one of a first and a second status;

a device for offering a fixed data pattern;

a first transmitter for transmitting ATM cells coming from the ATM communication layer into an ATM cell waiting list;

a second transmitter for transmitting an ATM cell from the ATM cell waiting list to a requesting time-division multiplex communication terminal when a respectively oldest control signal of the control signal sequence represents the first status, and transmitting the fixed data pattern to the requesting time-division multiplex communication terminal when the oldest control signal of the control signal sequence represents the second status; and a device for deleting the oldest control signal of the control signal sequence.

* * * * *